United States Patent
Hayes, Jr.

(10) Patent No.: US 8,732,065 B1
(45) Date of Patent: May 20, 2014

(54) ELECTRONIC TRADING SYSTEM AND METHOD

(75) Inventor: Michael Francis Hayes, Jr., Bedford, MA (US)

(73) Assignee: Finalta, Inc., Bedford, MA (US)

( * ) Notice: Subject to any disclaimer, the term of this patent is extended or adjusted under 35 U.S.C. 154(b) by 91 days.

(21) Appl. No.: 13/189,137

(22) Filed: Jul. 22, 2011

Related U.S. Application Data

(60) Provisional application No. 61/400,384, filed on Jul. 27, 2010.

(51) Int. Cl.
*G06Q 40/00* (2012.01)

(52) U.S. Cl.
USPC .......... 705/37; 705/26.1; 705/36 R; 714/4.21; 235/451; 715/758; 715/246; 455/456.1; 709/224

(58) Field of Classification Search
USPC ................. 705/36, 37; 709/203; 725/131
See application file for complete search history.

(56) References Cited

U.S. PATENT DOCUMENTS

| | | | | |
|---|---|---|---|---|
| 6,112,189 | A * | 8/2000 | Rickard et al. | 705/36 R |
| 6,195,647 | B1 * | 2/2001 | Martyn et al. | 705/36 R |
| 6,236,972 | B1 * | 5/2001 | Shkedy | 705/26.1 |
| 6,263,321 | B1 * | 7/2001 | Daughtery, III | 705/36 R |
| 6,282,521 | B1 * | 8/2001 | Howorka | 705/36 R |
| 6,317,727 | B1 * | 11/2001 | May | 705/36 R |
| 6,321,212 | B1 * | 11/2001 | Lange | 705/36 R |
| 6,347,307 | B1 * | 2/2002 | Sandhu et al. | 705/36 R |
| 6,360,210 | B1 * | 3/2002 | Wallman | 705/36 R |
| 6,418,419 | B1 * | 7/2002 | Nieboer et al. | 705/37 |
| 6,421,653 | B1 * | 7/2002 | May | 705/36 R |
| 6,505,174 | B1 * | 1/2003 | Keiser et al. | 705/36 R |
| 7,136,834 | B1 | 11/2006 | Merrin et al. | 705/37 |
| 7,251,629 | B1 * | 7/2007 | Marynowski et al. | 705/37 |
| 7,340,430 | B2 * | 3/2008 | Mulinder et al. | 705/37 |
| 7,447,655 | B2 * | 11/2008 | Brumfield et al. | 705/37 |
| 7,574,391 | B1 * | 8/2009 | Monroe et al. | 705/36 R |
| 7,747,515 | B1 | 6/2010 | Merrin et al. | 705/37 |
| 7,831,507 | B2 | 11/2010 | Merrin et al. | 705/37 |
| 7,890,417 | B2 * | 2/2011 | Hanson et al. | 705/37 |
| 8,055,576 | B2 | 11/2011 | Merrin et al. | 705/37 |
| 8,073,763 | B1 | 12/2011 | Merrin et al. | 705/37 |
| 2001/0044771 | A1 * | 11/2001 | Usher et al. | 705/37 |
| 2002/0082967 | A1 * | 6/2002 | Kaminsky et al. | 705/37 |

(Continued)

OTHER PUBLICATIONS

Liquidation of a Large Block of Stock, http://pages.towson.edu/mpemy/jbf.pdf, M. Pemy et al Sep. 21, 2006 (Block).*

(Continued)

*Primary Examiner* — Chika Ojiaku
(74) *Attorney, Agent, or Firm* — Sunstein Kann Murphy & Timbers LLP

(57) ABSTRACT

An electronic system and method to enable a market participant to identify potential trading counterparties while avoiding disadvantages associated with disclosure of the participant's trading intentions. In one embodiment, the system provides camouflage items that disguise the intent of a participant to trade an initial item. Camouflage items differ from the initial item but share with the initial item one or more attributes, e.g. a market, risk profile, price range, or other characteristic of the original item. Camouflage items are combined with the original item in a unified notification to prospective counterparties, so as to reduce the ability of the prospective counterparties to determine the trading intentions of the original participant.

18 Claims, 8 Drawing Sheets

(56) References Cited

U.S. PATENT DOCUMENTS

| | | | |
|---|---|---|---|
| 2002/0099651 A1* | 7/2002 | May | 705/38 |
| 2002/0116317 A1* | 8/2002 | May | 705/37 |
| 2002/0120542 A1* | 8/2002 | Higgins | 705/36 |
| 2002/0128955 A1* | 9/2002 | Brady et al. | 705/37 |
| 2002/0133456 A1* | 9/2002 | Lancaster et al. | 705/37 |
| 2003/0033235 A1* | 2/2003 | Hummelgren | 705/37 |
| 2003/0069826 A1* | 4/2003 | Guidi et al. | 705/37 |
| 2003/0078865 A1* | 4/2003 | Lee | 705/35 |
| 2003/0115128 A1* | 6/2003 | Lange et al. | 705/37 |
| 2003/0236737 A1* | 12/2003 | Kemp et al. | 705/37 |
| 2004/0006534 A1* | 1/2004 | Fung | 705/38 |
| 2004/0044613 A1* | 3/2004 | Murakami et al. | 705/37 |
| 2004/0064393 A1* | 4/2004 | Luenberger | 705/36 |
| 2004/0083158 A1* | 4/2004 | Addison et al. | 705/37 |
| 2004/0083165 A1* | 4/2004 | Lawrence | 705/38 |
| 2004/0148249 A1* | 7/2004 | Kinnear | 705/37 |
| 2004/0172355 A1* | 9/2004 | Pandher | 705/37 |
| 2004/0177024 A1* | 9/2004 | Bok et al. | 705/37 |
| 2004/0199455 A1* | 10/2004 | Saliba | 705/37 |
| 2004/0199459 A1* | 10/2004 | Johnston et al. | 705/38 |
| 2004/0210511 A1* | 10/2004 | Waelbroeck et al. | 705/37 |
| 2004/0267655 A1* | 12/2004 | Davidowitz et al. | 705/37 |
| 2005/0160024 A1* | 7/2005 | Soderborg et al. | 705/37 |
| 2005/0228741 A1* | 10/2005 | Leibowitz | 705/37 |
| 2005/0246261 A1* | 11/2005 | Stevens et al. | 705/37 |
| 2005/0260492 A1* | 11/2005 | Tucholski et al. | 429/185 |
| 2006/0160024 A1* | 7/2006 | Barr et al. | 430/270.1 |
| 2006/0184447 A1* | 8/2006 | Nieboer et al. | 705/37 |
| 2006/0253368 A1* | 11/2006 | O'Callahan et al. | 705/37 |
| 2007/0255642 A1* | 11/2007 | Keith | 705/37 |
| 2008/0091584 A1* | 4/2008 | Johnson et al. | 705/36 R |
| 2009/0119201 A1* | 5/2009 | Burns et al. | 705/37 |
| 2009/0265267 A1* | 10/2009 | Johnston et al. | 705/37 |
| 2010/0094746 A1* | 4/2010 | MacGregor et al. | 705/37 |
| 2010/0094772 A1* | 4/2010 | Peterffy | 705/36 R |
| 2010/0106634 A1* | 4/2010 | Atureliya | 705/35 |
| 2010/0306133 A1* | 12/2010 | Johnston et al. | 705/36 R |
| 2011/0040669 A1* | 2/2011 | Lee et al. | 705/37 |
| 2011/0112869 A1* | 5/2011 | Greak | 705/4 |

OTHER PUBLICATIONS

Wikipedia, the free encyclopedia, *Dark liquidity*, Wikipedia, the free encyclopedia, http://en.wikipedia.org/wiki/Dark_liquidity, Jun. 14, 2011, 6 pages.

* cited by examiner

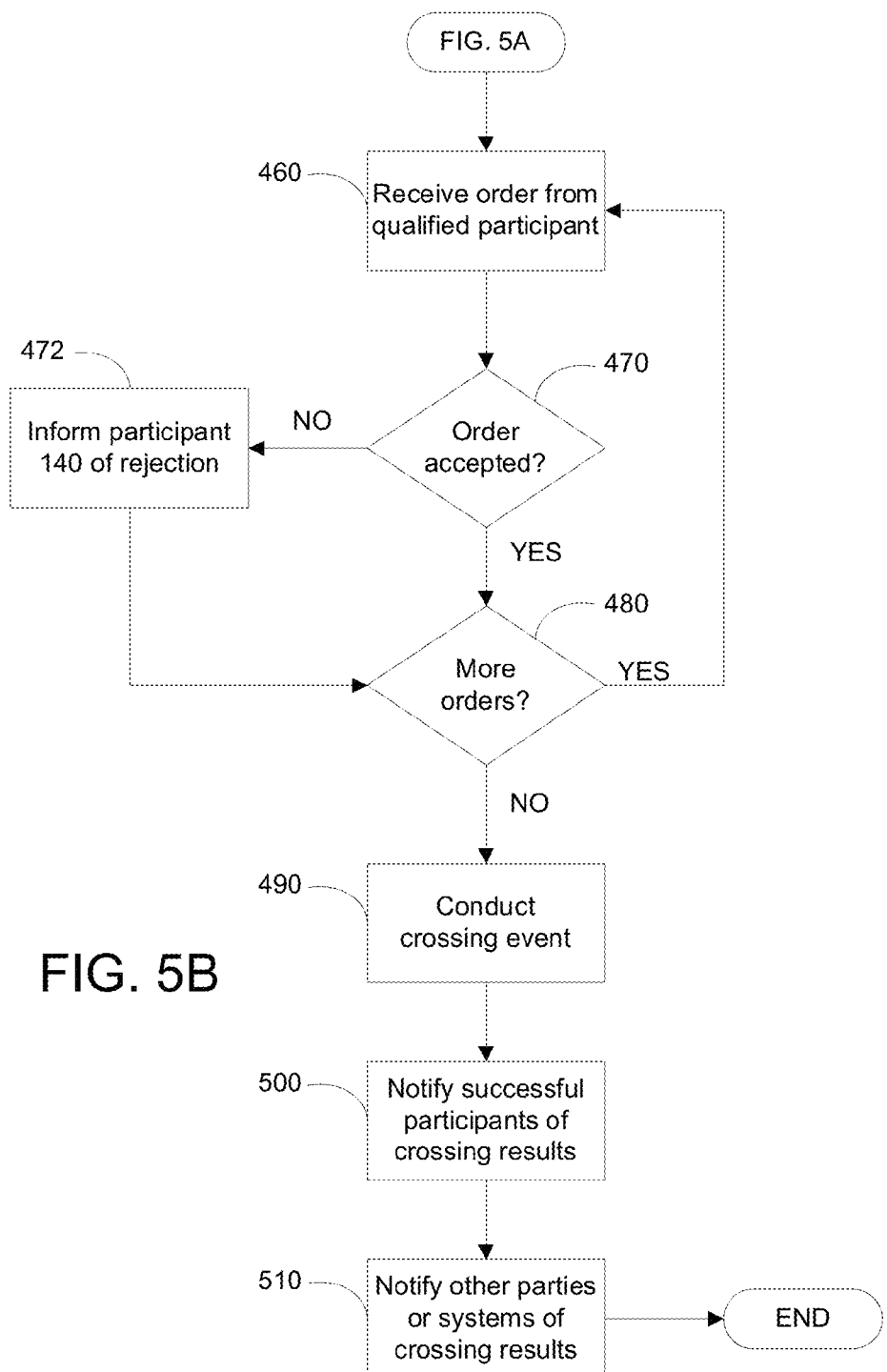

ELECTRONIC TRADING SYSTEM AND METHOD

CROSS REFERENCE TO RELATED APPLICATION

This application claims the benefit of provisional application Ser. No. 61/400,384, filed Jul. 27, 2010, which is hereby incorporated herein by reference in its entirety.

TECHNICAL FIELD

The present invention relates to electronic trading system or market transactions, and more particularly to enabling parties to transact relatively significant orders for an item without causing adverse market impact.

BACKGROUND ART

For many transactions, a buyer and a seller of a given item must become aware of one another in order to become counterparties to the transaction or "trade." In a computer-implemented electronic trading system, at least one party with a desire to buy an item and one party with a desire to sell the same item must become known to the system so it can execute the trade.

In general, there are two ways in which an electronic system can become aware of counterparties to a transaction. In the first case, buyers and sellers inform the system of their trading desires without any information about potential counterparties provided to them by the system, in the hope that a counterparty is using the same system. In the second case, at least one party informs the system of their trading desires in response to information regarding potential counterparties provided to them by the system. In the second case, the system facilitates the trade by communicating information regarding potential counterparties to users of the system. For the purposes of this background discussion, a party's trading desires include, but are not limited to, information such as what item is being bought or sold, how much of the item a party wants to buy or sell, and what price a party is willing to pay or accept.

In many trading systems or markets, there is an unavoidable problem created when any participant has a relatively significant desire to buy or sell. On the one hand, if other trading system or market participants become aware that there is a significant buyer or seller, this demand for (or supply of) a given item will tend to cause the price of the item to "move away" from the participant who revealed their trading desire to the trading system or market. The details of how this negative market impact occurs will be known to those schooled in the art, but the end result is that buyers end up buying at a higher price and sellers end up selling at a lower price than they would have if knowledge of their desires had not become known in the trading system or market.

On the other hand, if, in an effort to avoid the above dynamic, all trading system or market participants refuse to communicate their trading desires, then no buyer can find a seller, no seller can find a buyer, and no trading occurs.

In such situations, trading system or market participants are damaged if they do provide information about their trading desires to the market (because it will be used against them), but are also damaged if they do not provide such information (because they will not find a counterparty with whom they can trade).

This conflict of interest can be characterized as a question faced by every participant in a such a trading system or market: "how can I disclose enough information about my trading desires to get a trade done, without disclosing so much information that others can use it against me?" The prior art does not adequately answer this question in this context.

Known electronic trading systems and methods use one or both of two general approaches to limit the amount of information disseminated in order to communicate trading desires. In the first, the number of parties who receive the information is limited, hopefully to a subset of trading system or market participants who cannot (or are unlikely to) use the information against the party who provided it to the trading system or market. In securities markets, see, for example, U.S. Pat. No. 7,136,834.

In the second approach, information concerning the trading desires of a given party seeking to trade is only partially disclosed to other trading system or market participants, with the goal of limiting the ability of those participants to use information about the potential trade against the given party who provided the information to the trading system or market. In securities markets, see, for example, U.S. Pat. No. 7,685,052.

In securities markets, further discussion of problems faced by market participants in divulgation of their market desires appears in the article "Dark liquidity," available on Jun. 14, 2011 at http://en.wikipedia.org/wiki/Dark_liquidity.

Known trading systems and methods typically use one of two methods to determine the price at which a buyer and seller trade. In the first, the system allows the buyer and seller to negotiate a price by making offers and counter-offers at different price points. In the second approach, the system matches a buyer and a seller at a price derived from the price in an external system, such as the price in a public market. For example, if a system matches a buyer and seller of stock ABC at time X, it would use the price of stock ABC in the public stock market at time X to effect the trade. In this context, "the price" of a stock in a public stock market at a given point in time might mean the current bid, the current offer, the midpoint between the bid and offer, or some other derivative price at that point in time.

SUMMARY OF DISCLOSED EMBODIMENTS

Various embodiments of the present invention include a computer-implemented electronic trading system and method that enable buyers and sellers to safely identify one another and execute a transaction. In known trading systems, full disclosure of certain significant orders may have an adverse affect on terms for the trader initiating the transaction. Embodiments of the present invention overcome this problem by altering the content, form, and methods of transfer of information between potential parties to the transaction. Related embodiments provide computer-implemented systems and methods for the creation of self-organizing trading networks or markets as well as pricing algorithms.

Thus, in a first embodiment of the invention there is provided a computerized method of facilitating an electronic transaction that involves an initial item. The initial item is the subject of a first order from a first participant, wherein full disclosure of the first order, in advance of the transaction, might have an adverse effect on terms of the transaction for the first participant. The method first comprises receiving, from the first participant over a communications network, a message characterizing the first order relative to the initial item. Next, the method includes, in a first computer process, identifying a set of camouflage items based at least on the initial item. Then, the method requires sending, over the communications network, first notification messages to a set of second participants having contact information in a contact database, notifying them of an upcoming crossing event involving the initial item and the camouflage items. The method continues with receiving, from the set of second participants over the communications network, responsive messages characterizing a set of second orders relative to the crossing event, and in a second computer process, matching buyers and sellers of the initial item and the camouflage items based at least on the first order and the set of second orders. The method concludes by sending, over the communications network, second notification messages notifying the first participant and the set of second participants of the results of the matching. In this way, the adverse effect resulting from full disclosure of the first order is obviated.

The crossing event may optionally occur at a specified time or timeframe, in which case the first notification messages may each include an indication of the specified time or timeframe. Optionally, the first notification messages may each include a minimum order size necessary to participate in the upcoming crossing event. The first order may optionally include a price range, and matching buyers and sellers includes determining which second orders indicate a price that falls within the price range. In another embodiment, the method further includes determining whether the first order is acceptable based on a first set of acceptability criteria and if the first order is not acceptable, canceling the electronic transaction. This embodiment continues by, for each second order, judging the order against a second set of acceptability criteria, and if the order is not acceptable, rejecting the second order without canceling the electronic transaction.

In a related embodiment of the invention, the method further includes receiving over the network and adding, to the contact database, contact information of a new participant establishing the new participant as a member of the set of second participants, such contact information obtained pursuant to an invitation extended by the first participant or an already existing member of the second set of participants.

Alternatively or in addition, the method includes providing a user interface configured so that each participant may engage in inter-participant communication, over the network, that is related to the crossing event.

Alternatively or in addition, a participant in the inter-participant communication is identified to another participant by an alias.

Alternatively or in addition, the method includes providing a user interface configured so that each participant can interact over the network with other participants, the interface further configured so that each participant can limit counterparties with whom they trade according to criteria that include identity of the counterparty. The criteria may include other characteristics of the counterparty.

Alternatively or in addition, the method includes providing a user interface configured so that each participant can interact over the network with other participants, the interface further configured so that each participant can limit counterparties with whom they trade according to criteria that may include an alias of the counterparty.

In a further embodiment of the invention there is provided a method for determining a system price used when matching a buyer and seller of an item, where the price of the item is published in an external or third-party system and where the system price is determined by the system processing logic to be between a) the external price of the item at the time an initial order is communicated to the system, and b) the external price of the item at the time of the actual trade match, or crossing event.

In a further embodiment of the invention there is provided a computerized method for determining a transaction price for a transaction having a buyer and seller of a security that is traded in a public market, the public market providing, over a network, a time-dependent real-time stream of bid prices and offer prices for the security. The method includes receiving and storing the time-dependent stream of bid prices and offer prices over the network during a relevant time interval; in a first computer process, determining a midpoint price between the bid and offer prices of the item at the time an initial order is communicated to the system; in a second computer process, determining a midpoint price between the bid and offer prices of the item at the time of a prospective crossing event; and in a third computer process, determining the transaction price to be a mathematical average of the two midpoint prices and effectuating the prospective crossing event as the transaction.

In a related embodiment, the method includes, when the transaction price determined by the third computer process falls outside a range defined by the bid and offer prices of the item at the time of the crossing event, in a further computer process, adjusting the transaction price to be equal to a price, within the range, that is closest to the transaction price determined by the third computer process.

In another related embodiment, the method includes, when the transaction price determined by the third computer process falls outside a range defined by the bid and offer prices of the item at the time of the prospective crossing event, changing the transaction price to be undefined and preventing effectuation of the transaction based on the prospective crossing event.

Computerized systems that implement these methods are also disclosed. The methods may be executed using a computer program product that comprises a tangible, computer-useable data storage medium on which is stored computer program code for instructing a computer system to carry out these methods.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" of items includes at least one item.

An "item" is any saleable thing having a market. Items may include, among other things, commodities, securities, bonds, stocks or stock options, as well as non-financial instruments. An item may consist of a set or bundle of other items.

An "order" means electronic data that describe the trading desires of a trading system or market participant and includes, but is not limited to, information such as whether the participant wishes to buy or sell an item, which item or characteristics of the type of item the participant wishes to buy or sell, the maximum amount of the item the participant wishes to buy or sell, the minimum amount of the item the participant is willing to buy or sell, the timeframe within which the participant is willing to buy or sell and the price range within which the participant is willing to buy or sell.

With respect to any given item, a "camouflage item" is another item having characteristics that are similar to the given item. Items are "similar" when they share a market, a risk profile, a price range, an investment goal, a physical characteristic, or another characteristic so that, when a combined offering of the items is viewed by a participant or prospective trading counterparty, no one item appears to significantly differ from the other items according to the parameters of the offering.

References to "participants" shall have the meaning "participants or agents acting on behalf of participants."

A "crossing event" is an event wherein an intermediary, such as a broker or dealer, acting as agent on both sides of a transaction, effectuates the transaction.

Various embodiments of the present invention include a computer-implemented electronic trading system and method that enable buyers and sellers to safely identify one another and execute a transaction. In known trading systems, information regarding relatively significant orders, such as orders for items that are so large as to represent a significant fraction of the size of or trading volume in the trading system or market for that item, can negatively affect the market for those items. Embodiments of the present invention overcome this problem by altering the content, form, and methods of transfer of information between potential parties to a transaction. Related embodiments provide computer-implemented systems and methods for the creation of self-organizing trading networks or markets and pricing algorithms.

Figure 1:
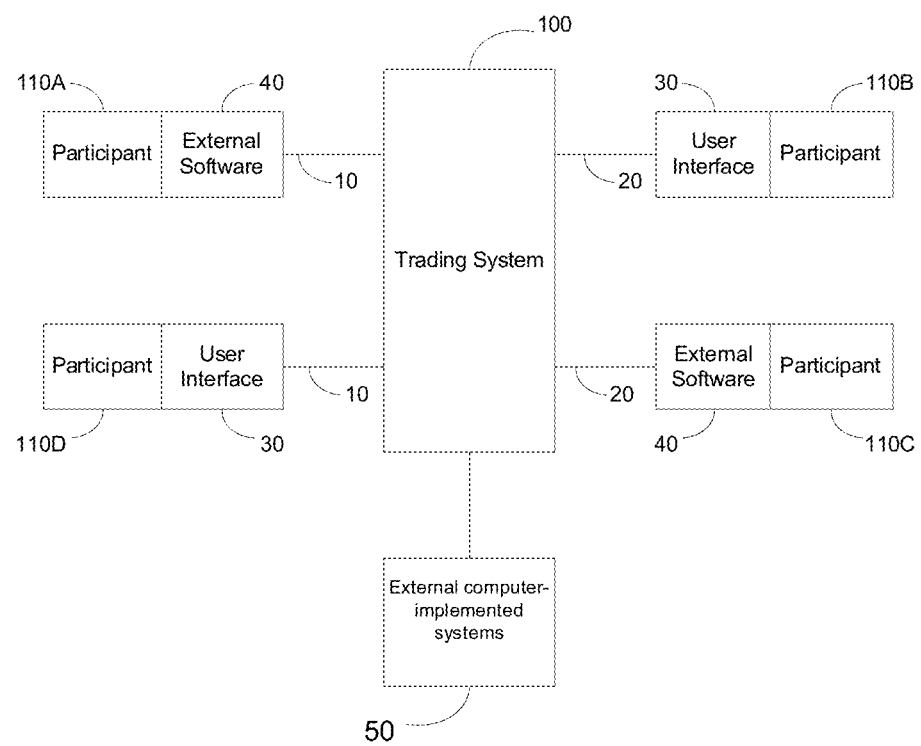
FIG. 1 is a high-level block view of a computer-implemented embodiment of the present invention.

FIG. 1 is a high-level block view of a computer-implemented embodiment of the present invention. Trading system 100 includes subsystems or modules common to any electronic system implemented in computer software and hardware. These include, but are not limited to, data storage subsystems, communications subsystems, input and output subsystems, and processing logic subsystems.

In this embodiment, trading system 100 communicates electronically with one or more external computer-implemented systems 50. Examples of external systems 50 include, but are not limited to, market data systems, pre-trade data and/or processing systems, post-trade data and/or processing systems, and external trading systems which may trade the same or complimentary types or classes of items as trading system 100. Some or all communication within trading system 100 and/or between trading system 100 and external systems 50 may be encrypted.

As illustrated in FIG. 1, trading system 100 communicates with individual participants 110 though either the Internet 10 or a dedicated communications network 20. FIG. 1 shows the trading system 100 in communication with four participants 110A, 110B, 110C, and 110D. Although for the purposes of clarity only four participants 110 are illustrated, other embodiments of the present invention can have many more (or fewer) participants 110 in communication with the trading system 100. Participants 110 interact and communicate with the trading system 100 either via the trading system user interface 30 available at the participant's location or via one or more external software systems 40 used by the participant 110, or both. Examples of external software systems 40 used by participants 110 include, but are not limited to, Internet browsers, Order Management Systems, Execution Management Systems, third-party portals or terminals, email systems, instant messaging systems, telephony systems, and social networks.

Figure 2:
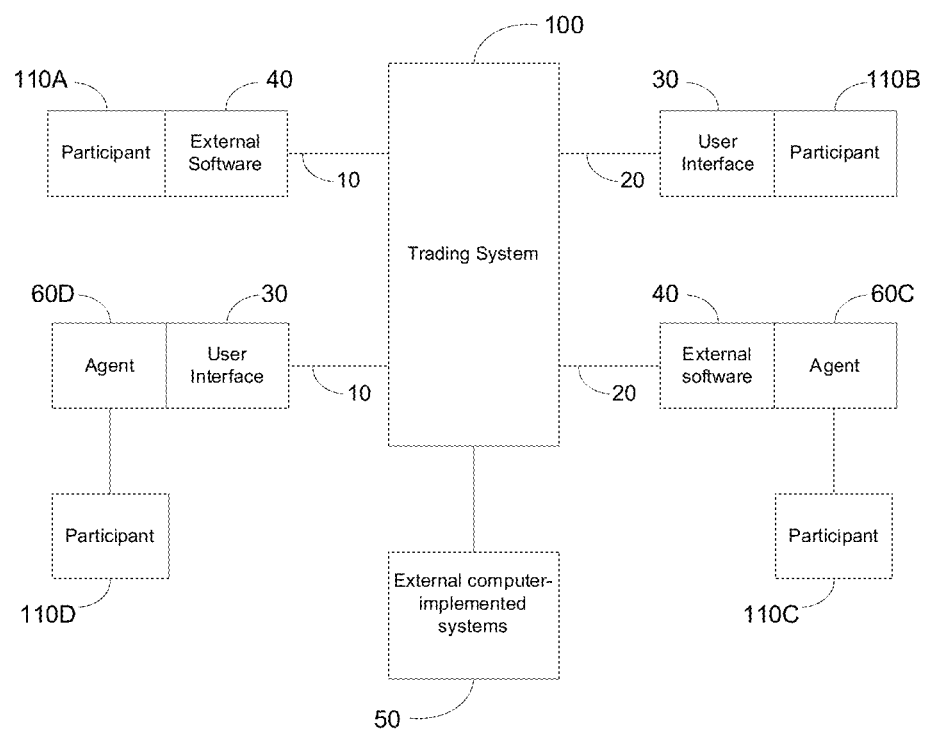
FIG. 2 is a high-level block view of an alternative computer-implemented embodiment of the present invention.

FIG. 2 illustrates an alternate embodiment wherein one or more participants 110 interact and communicate with trading system 100 via participant agents 60 acting on behalf of participants 110. Although for the purposes of clarity only two agents 60C and 60D are shown acting on behalf of participants 110C and 110D respectively, various other embodiments of the present invention can have many more (or fewer) agents 60 interacting and communicating with the trading system 100.

Participant 110 identity is verified by trading system 100 through a variety of means, including, but not limited to, some or all of the following: participant 110 interaction with the user interface 30 (for example, the provision by participant 110 of a user name and password), the specific machine or network address of a participant 110's computer, biometric identification, and/or third party identification verification systems.

Figure 3:
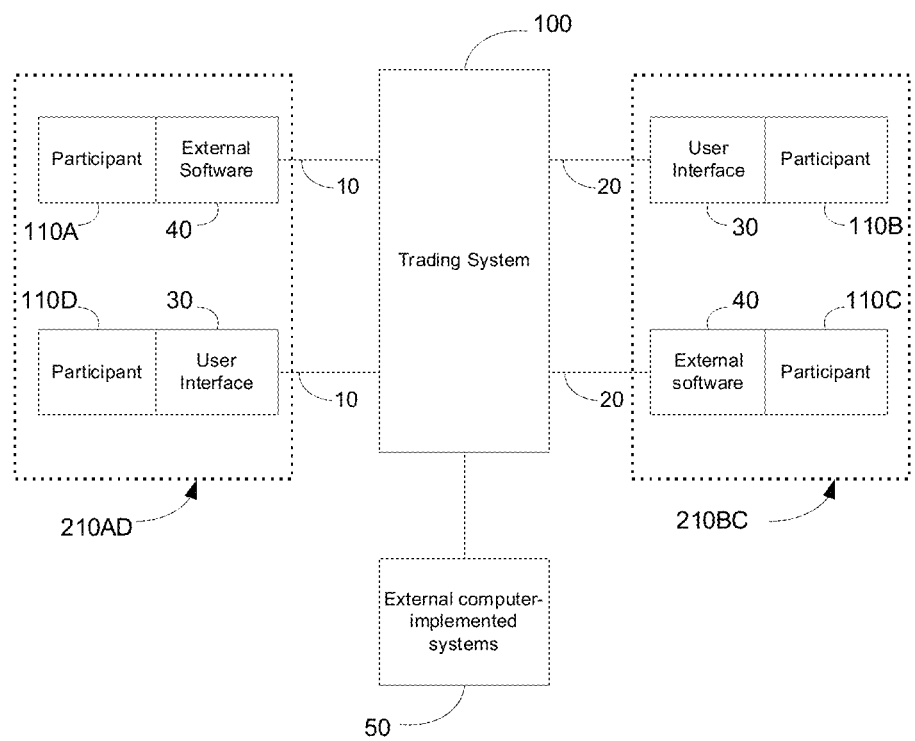
FIG. 3 is a high-level block view of a computer-implemented embodiment of the present invention.

Participants 110 may interact with trading system 100 as employees of firms 210 or simply as individuals. FIG. 3 shows the trading system 100 in communication with two participants 110A and 110D employed by firm 210AD and two participants 110B and 110C employed by firm 210BC. Although for the purposes of clarity only two firms 210 are illustrated, other embodiments of the present invention can have many more (or fewer) firms 210 in communication with the trading system 100. In this embodiment, participation in the trading system 100 is limited to participants 110 and/or firms 210 that meet specific criteria determined by the trading system 100.

Figure 4:
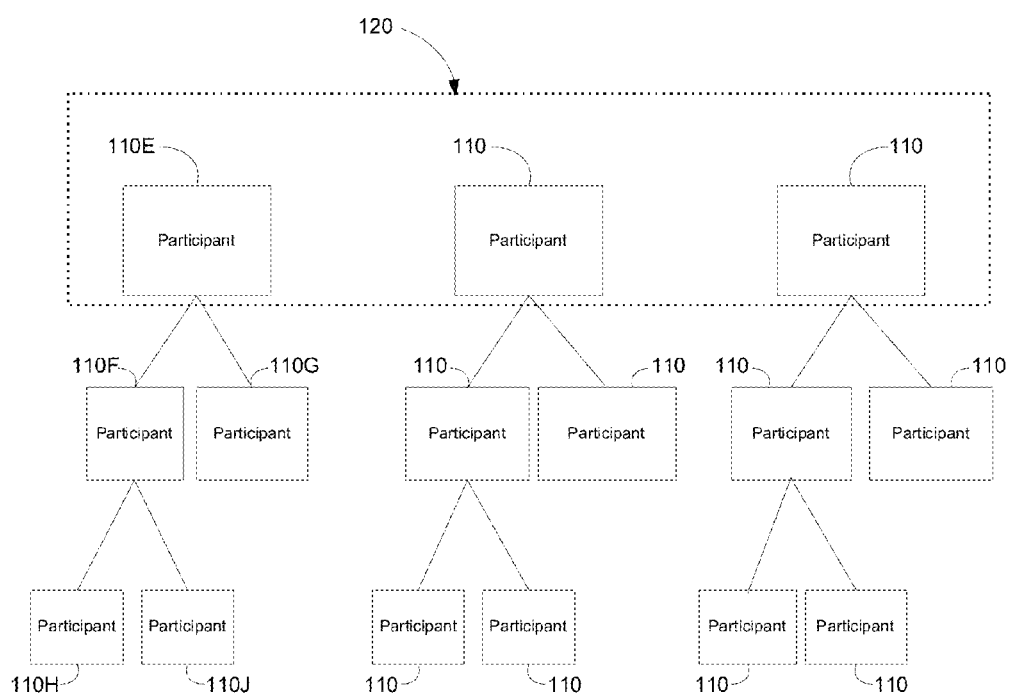
FIG. 4 is a high-level block view illustrating the creation of a self-organizing trading network in a computer-implemented embodiment of the present invention.

FIG. 4 illustrates an embodiment wherein an initial group of participants 120 (a subset of all participants 110) are provided access to trading system 100 by the provider of the trading system 100, and all other participants 110 are invited to participate in the trading system 100 by either a) one of the initial participants 120, or b) a participant 110 who has already accepted an invitation. In such an embodiment, the participants 110 form a self-organizing trading network or market. FIG. 4 illustrates two generations of invitations. Participant 110E is illustrated inviting participants 110F and 110G in the first generation of invitations. Participant 110F is illustrated subsequently inviting participants 110H and 110J in the second generation of invitations. Although for the purposes of clarity only two generations of invitations are illustrated, various other embodiments of the present invention can have many more (or fewer) generations of invitations.

Individual-specific profiles for participants 110 are created, stored, and enhanced by the trading system 100 based on information including, but not limited to, some or all of the following: information provided to the trading system 100 by a participant 110, information provided to the provider of the trading system 100 by a participant 110, a participant 110's actions when interacting with the trading system 100, publicly available information about a participant 110, information about a participant 110 provided by third parties, and information from all sources regarding firms 210 employing participants 110.

Firm-specific profiles for firms 210 may be created, stored, and enhanced based on information including, but not limited to, some or all of the following: the individual-specific profiles for participants 110 employed by a firm 210, information provided to the trading system 100 by a participant 110, publicly available information about a firm 210, and information about a firm 210 provided by third parties.

Figure 5A:
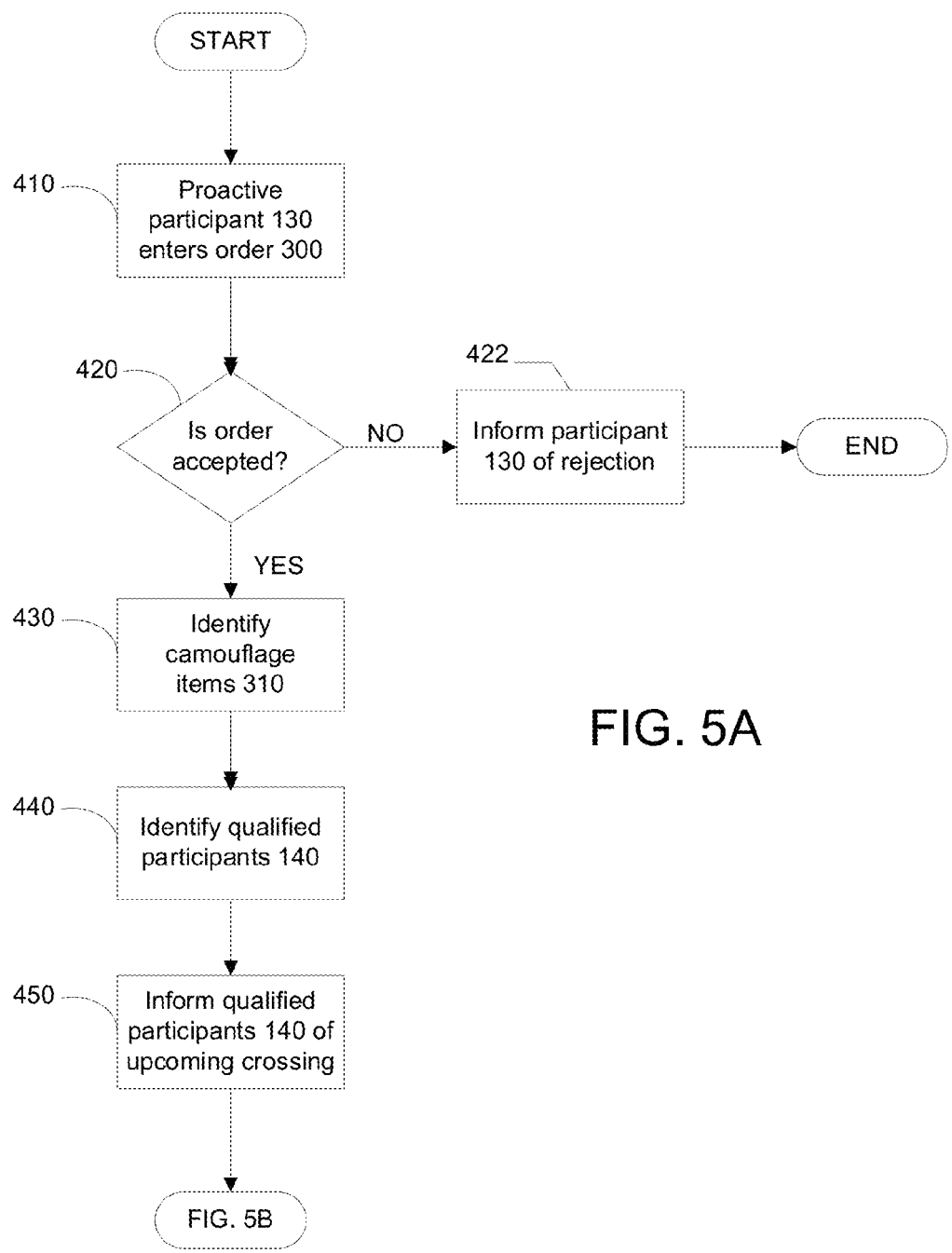
FIG. 5 is a flow diagram illustrating the actions performed by a computer-implemented embodiment of the present invention.

Participants 110 may enter orders into the trading system 100 either proactively or reactively. FIGS. 5A and 5B are flow diagrams illustrating the actions performed by an embodiment of the present invention. A proactive participant 130 (a subset of all participants 110) begins the process that leads to a crossing event in trading system 100 by entering an initial order 300 into trading system 100 in process 410. If an initial order 300 does not meet any acceptance requirements determined by trading system 100, it is rejected in process 420 and the proactive participant 130 who entered the initial order 300 is notified of said rejection in process 422.

If an initial order 300 is accepted by the trading system 100 in process 420, the trading system 100 identifies in process 430 one or more "camouflage items" 310 (as defined above) that are similar to the item in the initial order 300. These similar items identified by the trading system 100 are used to camouflage the initial order 300 as described below. Trading system 100 processing logic determines both the number and characteristics of camouflage items 310. For purposes of example only, if an initial order 300 to buy shares of a hypothetical stock XYZ is accepted by the trading system 100, then the trading system 100 might identify two camouflage items 310, one stock ABC and another stock PQR, where stocks ABC and PQR are determined by trading system 100 to possess characteristics similar to those of stock XYZ.

Because suitable camouflage items are those which a market participant cannot distinguish from an item in an initial order, the selection of suitable camouflage items requires a knowledge of the particular market involved. For example, when the items are securities, criteria for selection of suitable camouflage items include (in relation to the item of in an initial order) the average daily trading volume of the item, the market capitalization of the company whose securities constitute the item, the economic sector of the company, the volatility of the item, and recent price trend of the item. When the item of the initial order is an option rather than the underlying security, then additional criteria may come into play, including the expiration date of the option. When the item of the initial order is a commodity future, other criteria must be used that relate to the nature of the commodities market.

After camouflage items 310 are identified by the trading system 100 in process 430, the trading system 100 identifies in process 440 qualified participants 140 (a subset of all participants 110) who are candidates to trade with proactive participant 130 and each other. Qualified participants 140 are those participants 110 a) whose individual-specific profile (see above) indicates that they trade the type or class of item in the initial order 300 and b) who meet any additional qualification requirements set by the trading system 100. Trading system 100 then notifies qualified participants 140 in process 450 that a crossing event for the item in the initial order 300 and camouflage items 310 is going to occur at a future time or in a future timeframe. The trading system 100 also notifies qualified participants 140 in process 450 of any specific requirements for entering orders into the upcoming crossing event. In an alternate embodiment, the trading system 100 also notifies qualified participants 140 in process 450 that there is a buyer or seller (as appropriate based on the initial order 300) in at least one of the items in the upcoming crossing event. Qualified participants 140 who receive a notification of an upcoming crossing event do not know which of the items in the upcoming crossing event is the item in the initial order 300, and which are camouflage items 310.

Qualified participants 140 who receive notification of an upcoming crossing event may enter orders for any of the items in the upcoming crossing event anytime prior to the crossing event. These orders are received by the trading system 100 in process 460. If such an order does not meet any requirements determined by trading system 100, as determined in process 470, it is rejected and the appropriate qualified participant 140 is notified of said rejection in process 472. Proactive participants 130 and qualified participants 140 may adjust and/or cancel entered orders during a timeframe determined by the trading system 100. For example purposes only, returning to the example above of an initial order 300 to buy stock XYZ, qualified participants 140 might receive notification that "there will be a crossing event of stocks ABC, XYZ, and PQR in 30 seconds." After the order is accepted or rejected in process 470, the trading system 100 determines in process 480 whether it has received more orders, or an adjusted or canceled order, during the appropriate timeframe. If so, the method returns to process 460 as indicated, to process an additional order. If not, the method continues to process 490 to conduct a crossing event.

In one embodiment, individual buyer and seller participants 110 of any of the items involved in the crossing event are matched at the time of the crossing event by the trading system 100 processing logic in process 490. Any successful trades are communicated by the trading system 100 to the applicable participants 110 in process 500, and to any other applicable parties or systems in process 510. Because the crossing event occurs for both the item in the initial order 300 and camouflage items 310, any party who becomes aware of the results of a crossing event will not know which item was in the initial order 300 and which were the camouflage items 310.

In a further related embodiment, qualified participants 140 who receive notification of an upcoming crossing event in process 450 may enter orders anytime prior to a time interval before the crossing event, where such time interval is determined by trading system 100. If such an order does not meet any requirements determined by trading system 100 in process 470, it is rejected and the appropriate qualified participant 140 is notified of said rejection in process 472. Proactive participants 130 and qualified participants 140 may adjust and/or cancel entered orders during a timeframe determined by the trading system 100. For illustration purposes only, returning to the example above of an initial order 300 to buy stock XYZ, qualified participants 140 might receive notification that "there will be a crossing event of stocks ABC, XYZ, and PQR in 4-5 minutes."

In another related embodiment, items from multiple initial orders 300 from one or more proactive participants 130 are combined with their corresponding camouflage items 310 into a single crossing event.

Optionally, a proactive participant 130 who entered an initial order 300 is also notified by the trading system 100 of the camouflage items 310 and is able to enter orders for the camouflage items into resulting crossing event.

Optionally, the trading system 100 initiates some or all crossing events without any proactive action by any participant 110. In embodiments where crossing events are initiated by both proactive participants 130 and by the trading system 100, the form, content, and methods of notifications of an upcoming crossing event sent by the trading system 100 to participants 110 in the two scenarios are the same. Participants 110 therefore cannot tell when a crossing event is initiated by a proactive participant 130 or by the trading system 100.

Also optionally, after a specific crossing event, the trading system 100 communicates with some or all of the participants 110 who entered orders in the specific crossing event regarding subsequent trading opportunities in the items in the specific crossing event.

In a further related embodiment, some or all participants 110 and/or firms 210 have a corresponding system alias identity. For example purposes only, participant 110 John Smith might have system alias identity Trader456, and firm 210 Franklin Smith Investments might have system alias identity Firm958.

In various embodiments, the identities of all participants 110 and firms 210 remain unknown to all other participants 110 at all times. However, in other embodiments, some or all of the following are provided to participants 110 when determined appropriate by trading system 100: the identities of other participants 110, the system alias identities of other participants 110, the identities of other firms 210, and the system alias identities of other firms 210.

Optionally, the trading system 100 is configured to enable participants 110 to limit which counterparties they trade with using various criteria, including, but not limited to, some or all of the following: firm 210 identity, firm 210 system alias identity, firm-specific profiles, participant 110 identity, participant 110 system alias identity, and individual-specific profiles.

Optionally, the trading system 100 is configured to facilitate direct interaction and/or communication between some or all participants 110 before, during, or after a crossing event.

Figure 6:
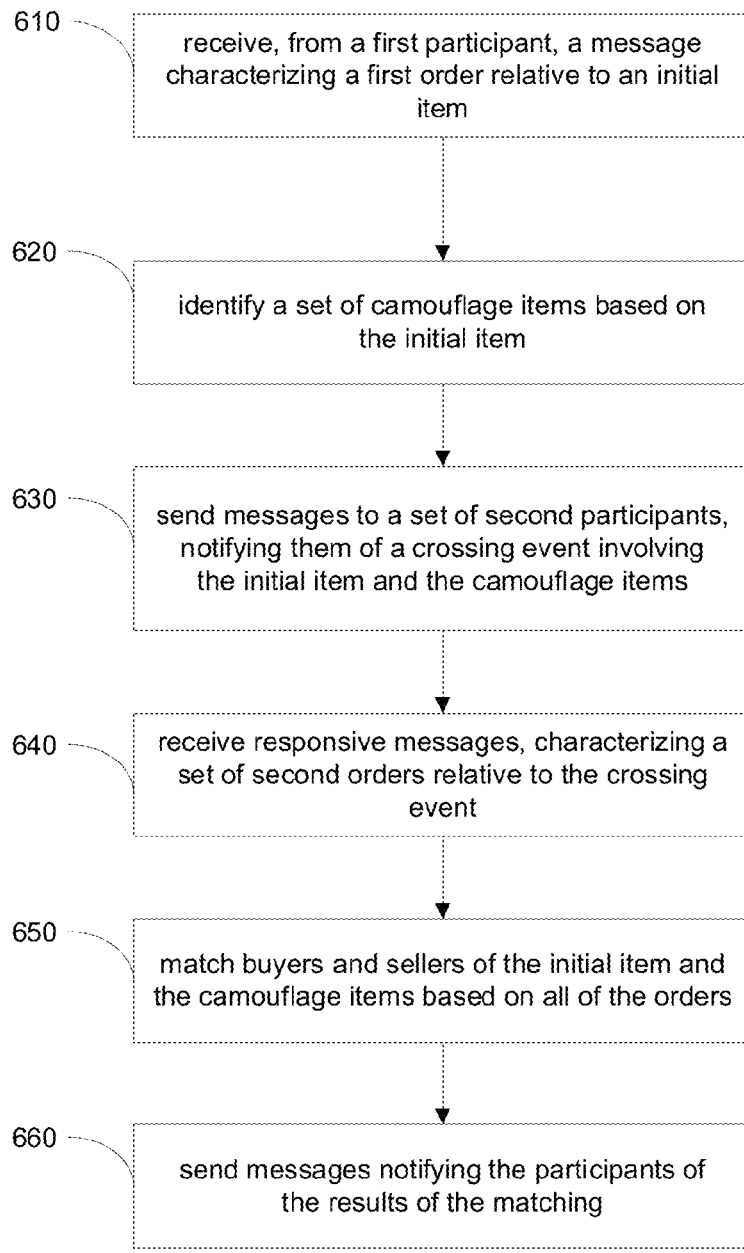
FIG. 6 is a flow diagram illustrating processes performed by another embodiment of the invention.

FIG. 6 shows the processes performed by a method in another embodiment of the invention. In process 610, the method begins with receiving, from a first (initial) participant, over a communications network, a message characterizing a first order relative to an initial item. Next, process 620 requires identifying a set of camouflage items based at least on the initial item. The camouflage items may be selected from a database of items (which database may be local to a computer system performing the method or it may be remote). Alternatively, the camouflage items may be dynamically constructed from other information or items, or the camouflage item itself may be constructed as a derivative of other items. Then, process 630 calls for sending, over the communications network, first notification messages to a set of second (qualified) participants, notifying them of an upcoming crossing event involving the initial item and the camouflage items. These notifications messages do not distinguish between the initial item and the camouflage items, so the qualified participants do not have enough information to place the initial participant at a disadvantage in the trading system or market. Once the qualified participants have made their choices, process 640 includes receiving, from the set of second participants over the communications network, responsive messages characterizing their orders relative to the crossing event. The following process 650 requires matching buyers and sellers of the initial item and the camouflage items based at least on the first order and the set of second orders. Thus, the initial item is exchanged without attracting undue attention, while at the same time, the camouflage items are also exchanged as a matter of efficiency. Finally, process 660 includes sending, over the communications network, second notification messages notifying the first participant and the set of second participants of the results of the matching.

Known trading systems that use external systems to determine prices at which trading occurs have a particular problem whose solution is now discussed. Since in many external systems or markets the price of securities changes continuously during market hours, it is common for the price to rise or fall between the time a first participant enters and order and the time a counterparty enters an order that leads to a trade match. One party will always be disadvantaged by this price change, while the other is advantaged by the same amount.

Embodiments of the present invention provide a solution to mitigate the magnitude of the price change, resulting in less disadvantage for one party and correspondingly less advantage for the other, with the result that both parties are likely to feel that the price of the trade was more fair and balanced. In one embodiment, when matching a buyer and seller of an item, the system price is determined by the system processing logic to be between (a) the externally-determined price of the item at the time an initial order is communicated to the system, and (b) the externally-determined price of the item at the time of the actual trade match, or crossing event. More particularly, an embodiment provides a method for determining the system price used when matching a buyer and seller of a security that is traded in a public market, wherein the public market displays continuously during market hours a bid (price to buy) and offer (price to sell). The embodiment determines the system price as the mathematical average of (a) the midpoint price between the bid and offer prices of the item at the time an initial order is communicated to the system, and (b) the midpoint price between the bid and offer prices of the item at the time of the actual trade match, or crossing event.

Figure 7:
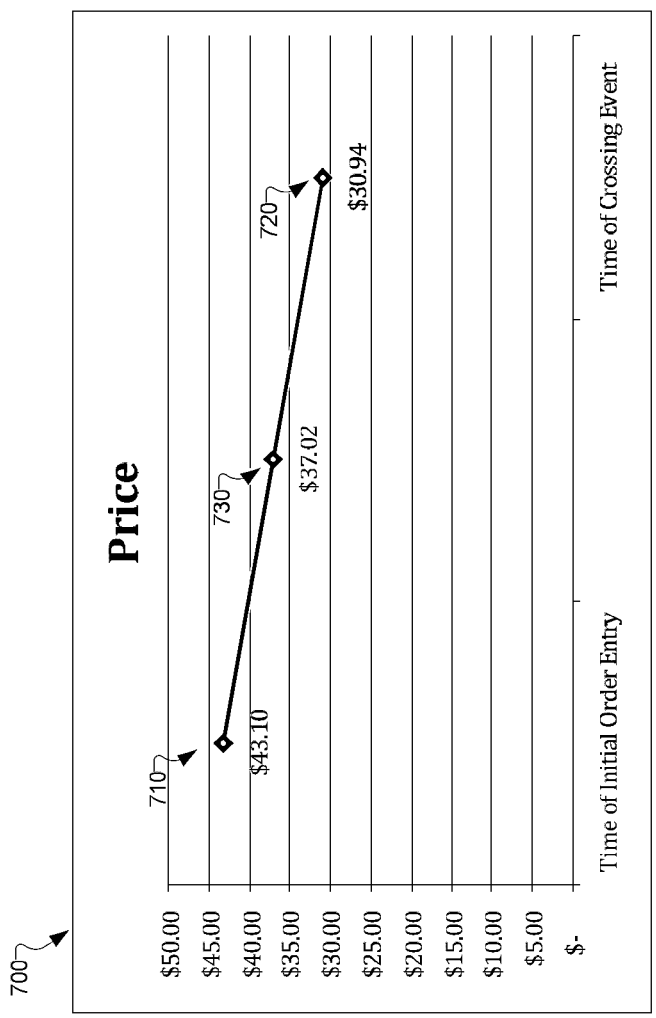
FIG. 7 is a graph illustrating how the price of an item may change as a function of time.

FIG. 7 shows a graph 700 illustrating how the price of an item may change as a function of time. At the time of initial order entry, the item has a price $43.10 that is the midpoint of the bid and offer prices, as shown by arrow 710. The midpoint price of the item falls significantly by the time the crossing event occurs, as shown by its value of $30.94 at arrow 720. Thus, price (a) is indicated by arrow 710, and price (b) is indicated by arrow 720. The mathematical average price at which to conduct the transaction, as determined by the embodiment, is indicated by arrow 730. In a related embodiment, the average price is compared to the price range defined by the bid and offer prices, to ensure that it falls within this range at the time of the trade match, or crossing event. If the average price falls outside the range, the transaction may be executed at the price within the range that is closest to the computed average. Alternatively, the transaction may be executed at another price, or not executed at all.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computerized method of facilitating an electronic transaction that involves an initial item that is the subject of a first order, from a first participant, to buy or sell the initial item, wherein disclosure of the first order, in advance of the transaction, might have an adverse effect on terms of the transaction for the first participant, the method comprising:

receiving, from the first participant over a communications network, a message characterizing the first order relative to the initial item;

in a first computer process, identifying a set of camouflage items based at least on the initial item, the set of camouflage items being identified in such a way that, in an upcoming crossing event for individual items in a list that includes the initial item and the set of camouflage items, a second participant cannot distinguish which of the items in the list is the initial item, and so that each camouflage item in the set of camouflage items differs from the initial item but shares with the initial item one or more attributes selected from the group consisting of a market, a risk profile, a price range, an investment goal, a physical characteristic, an average daily trading volume, a market capitalization, an economic sector, a volatility, a recent price trend, an expiration date, a securities market criterion, an options market criterion, and a commodity futures market criterion;

sending, over the communications network, first notification messages to a set of second participants having contact information in a contact database, the first notification messages notifying the set of second participants of the upcoming crossing event for individual items in the list including the initial item and the set of camouflage items;

receiving, from the set of second participants over the communications network, responsive messages characterizing a set of second orders to buy or sell one or more of the items involved in the crossing event;

in a second computer process, processing the orders to identify any matches between an order to buy and an order to sell any of the items involved in the crossing event, wherein each such match defines a corresponding set of participants who are successful; and sending, over the communications network, second notification messages notifying each set of successful participants of the corresponding match.

2. A method according to claim 1, further comprising providing notification to the set of second participants that the crossing event is scheduled to occur at a specified time or timeframe.

3. A method according to claim 1, further comprising providing notification to the set of second participants that a minimum order size is necessary to participate in the upcoming crossing event.

4. A method according claim 1, wherein the first order includes a price range, and wherein processing the orders includes determining which second orders indicate a price range that falls within the first order price range.

5. A method according to claim 1, further comprising:
determining whether the first order is acceptable based on a first set of acceptability criteria;
if the first order is not acceptable, canceling the upcoming crossing event; and
for each order of the set of second orders, judging such order against a second set of acceptability criteria, and if the order is not acceptable, rejecting the second order without canceling the upcoming crossing event.

6. A method according to claim 1, further comprising:
receiving over the network and adding, to the contact database, contact information of a new participant establishing the new participant as a member of the set of second participants, such contact information obtained pursuant to an invitation extended by the first participant or an already existing member of the second set of participants.

7. A method according to claim 1, further comprising:
providing a user interface configured so that each participant may engage in inter-participant communication, over the network, that is related to the crossing event.

8. A method according to claim 7, further comprising identifying a first participant in the inter-participant communication to a second participant by an alias.

9. A method according to claim 8, further comprising:
providing a user interface configured so that each participant can interact over the network with other participants, the interface further configured so that each participant can limit counterparties with whom they trade according to criteria that may include using an alias to identify such participant.

10. A method according to claim 1, further comprising:
providing a user interface configured so that each participant can limit trading with other participants according to criteria that include an identity of at least one other participant.

11. A method according to claim 10, further comprising providing a user interface configured so that each participant can limit trading with other participants according to criteria that include characteristics of the at least one other participant other than the identity of the at least one other participant.

12. A method according to claim 1, further comprising determining a system price used when matching a buyer and seller of an item, where the price of the item is published in an external or third-party system and where the system price is determined by the system processing logic to be between a) the external price of the item at the time an initial order is communicated to the system, and b) the external price of the item at the time of a successful trade match.

13. A computerized method according to claim 1, further comprising determining a transaction price for a prospective transaction having a buyer and seller of a security that is traded in a public market, the public market providing, over a network, a time-dependent real-time stream of bid prices and offer prices for the security, the method comprising:
receiving and storing the time-dependent stream of bid prices and offer prices over the network during a relevant time interval;
in a third computer process, determining a midpoint price between the bid and offer prices of the item at the time an initial order is communicated to the system;
in a fourth computer process, determining a midpoint price between the bid and offer prices of the item at the time of the prospective transaction; and
in a fifth computer process, determining the transaction price to be a mathematical average of the two midpoint prices.

14. A method according claim 13, further comprising, when the transaction price determined by the fifth computer process falls outside a range defined by the bid and offer prices of the item at the time of the prospective transaction, in a further computer process, adjusting the transaction price to be equal to a price, within the range, that is closest to the transaction price determined by the fifth computer process.

15. A method according to claim 13, further comprising, when the transaction price determined by the fifth computer process falls outside a range defined by the bid and offer prices of the item at the time of the prospective transaction, changing the transaction price to be undefined and preventing effectuation of the prospective transaction.

16. A method according to claim 1, further comprising providing notification to the set of second participants of any specific requirements to participate in the upcoming crossing event.

17. A method according to claim 16, further comprising, for any second order that does not meet the specific requirements, rejecting such second order and providing notification to the appropriate second participant of said rejection.

18. A computerized system for facilitating an electronic transaction that involves an initial item that is the subject of a first order, from a first participant, to buy or sell the initial item, wherein disclosure of the first order, in advance of the transaction, might have an adverse effect on terms of the transaction for the first participant, the system implementing a computerized method comprising:

receiving, from the first participant over a communications network, a message characterizing the first order relative to the initial item;

in a first computer process, identifying a set of camouflage items based at least on the initial item, the set of camouflage items being identified in such a way that, in an upcoming crossing event for individual items in a list that includes the initial item and the set of camouflage items, a second participant cannot distinguish which of the items in the list is the initial item, and so that each camouflage item in the set of camouflage items differs from the initial item but shares with the initial item one or more attributes selected from the group consisting of a market, a risk profile, a price range, an investment goal, a physical characteristic, an average daily trading volume, a market capitalization, an economic sector, a volatility, a recent price trend, an expiration date, a securities market criterion, an options market criterion, and a commodity futures market criterion;

sending, over the communications network, first notification messages to a set of second participants having contact information in a contact database, the first notification messages notifying the set of second participants of the upcoming crossing event for individual items in the list including the initial item and the set of camouflage items;

receiving, from the set of second participants over the communications network, responsive messages characterizing a set of second orders to buy or sell one or more of the items involved in the crossing event;

in a second computer process, processing the orders to identify any matches between an order to buy and an order to sell any of the items involved in the crossing event, wherein each such match defines a corresponding set of participants who are successful; and sending, over the communications network, second notification messages notifying each set of successful participants of the corresponding match.

\* \* \* \* \*